United States Patent Office 2,725,333

Patented Nov. 29, 1955

2,725,333

ORGANIC DITHIOPHOSPHATE COMPOUNDS

George Allen Buntin, Wilmington, Del., assignor to Hercules Powder Company, Wilmington, Del., a corporation of Delaware No Drawing. Application December 30, 1954, Serial No. 478,893

8 Claims. (Cl. 167—33)

This invention relates to new and useful organic dithiophosphate compouds and to pesticidal compositions containing the same.

The novel organic dithiophosphate compounds of this invention have the general formula

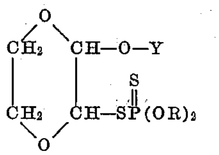

in which each R represents a lower alkyl or haloalkyl radical, and Y represents an alkyl, haloalkyl, nitroalkyl or halonitroalkyl.

These organic dithiophosphate compounds have pesticidal properties and distinguish themselves from known pesticidal compounds in being more toxic at low concentrations toward certain pests and in having a much longer residual toxicity toward mites when sprayed on plants normally attacked by such pests.

The organic dithiophosphate compounds of this invention are made by reacting 2,3-dichloro-p-dioxane or 2,3-dibromo-p-dioxane with an alcohol HOY to produce the corresponding 2-chlorodioxane substituted in the 3 position with an OY group, and then reacting this intermediate with the desired diester of dithiophosphoric acid which is the reaction product of a lower aliphatic alcohol, or a mixture of lower aliphatic alcohols, of the formula ROH and $P_2S_5$.

The compositions of this invention are thus produced from 2,3-dichloro or 2,3-dibromo-p-dioxane by substituting the first halogen by an alkoxy or substituted alkoxy group and substituting the second halogen by a dithiophosphate ester group.

The methods of making the products of this invention and methods of using the products as pesticides are more particularly described in the following examples in which all parts and percentages are by weight.

*Example 1*

A solution of 100 parts 2,3-dichloro-p-dioxane and 62.6 parts 2,2,2-trichloroethanol in about 170 parts toluene was refluxed at about 110° C. for 30 hours during which time hydrogen chloride was slowly evolved. The toluene was distilled off and the residue distilled under reduced pressure. The fraction boiling at 115–120° C. (2.5 mm.) amounting to 65.5 parts was 2-chloro-3-(2,2,2-trichloroethoxy)-p-dioxane which crystallized on cooling. After crystallization a sample melted at 77–78° C. and analyzed 52.3% chlorine.

To a solution of 27.0 parts 2-chloro-3-(2,2,2-trichloroethoxy)-p-dioxane in about 40 parts dry benzene containing 0.05 part hydroquinone was slowly added a solution of 21.4 parts O,O-diethyl hydrogen phosphorodithioate, 8.3 parts pyridine and about 80 parts benzene. The mixture was refluxed at about 80° C. for 12 hours, dissolved in ether and washed with water. The organic phase was separated, washed with 5% aqueous potassium hydroxide solution and dried over sodium sulfate. The solvent was distilled off the reaction mixture under reduced pressure and finally heated up to 90° C. at 0.5 mm. in removing the last of the solvent. The residue, amounting to 29.2 parts, was 2-(2,2,2-trichloroethoxy)-3-p-dioxanethiol S-(O,O-diethyl phosphorodithioate). The latter analyzed: 25.0% Cl, 15.2% S, 7.0% P, $$n_D^{20}=1.5240$$

This compound was an excellent insecticide as shown by the data in the table below.

*Example 2*

A solution of 78.5 parts 2,3-dichloro-p-dioxane and 69.3 parts 1,1,1-trichloro-3-nitro-2-propanol in about 170 parts toluene was refluxed at about 110° C. for 100 hours during which time hydrogen chloride was slowly evolved. The reaction mixture was then subjected to distillation to remove toluene, unreacted 2,3-dichloro-p-dioxane and 1,1,1-trichloro-3-nitro-2-propanol, and to recover 71.7 parts 2 - chloro - 3-(1,1,1-trichloro-3-nitro-2-propoxy)-p-dioxane as a viscous oil, B. P. 145–155 (1 mm.). The latter analyzed 43.1% chlorine and 4.41% nitrogen.

To a solution of 16.5 parts 2-chloro-3-(1,1,1-trichloro-3-nitro-2-propoxy)-p-dioxane in 20 parts benzene containing 0.05 part hydroquinone was slowly added a solution of 11.1 parts O,O-diethyl hydrogen phosphorodithioate, 4.0 parts pyridine and 80 parts benzene. The resulting mixture was refluxed at about 80° C. for 8 hours and then washed with a 15% aqueous sodium chloride solution. The organic phase was separated and washed with 4% aqueous sodium hydroxide solution, with water and finally dried over anhydrous magnesium sulfate. After distilling off the solvent from the organic phase there was obtained a semi-solid residue amounting to 22 parts which had the following analysis: Cl, 22.5%; P, 6.6%; S, 13.7% and was 3-(1,1,1-trichloro-3-nitro-2-propoxy)-2-p-dioxanethiol S-(O,O-diethyl phosphorodithioate). This compound was an excellent insecticide as shown by the data in the table below.

*Example 3*

A mixture of 57 parts pentaerythritol trichlorohydrin and 78.5 parts 2,3-dichloro-p-dioxane in 170 parts dry toluene was heated at about 110° C. under reflux for 48 hours and then distilled. The fraction boiling at 135–145° C. (1.0 mm.) after crystallization from hexane melted at 94–95° C. This was 2-chloro-3-[2,2-bis-(chloromethyl)-3-chloro-1-propoxy]-p-dioxane. It analyzed 45.4% chlorine.

To a solution of 15.6 parts 2-chloro-3-[2,2-bis(chloromethyl)-3-chloro-1-propoxy]-p-dioxane in 25 parts benzene containing 0.05 part hydroquinone was added a solution of 11.1 parts O,O-diethyl hydrogen phosphorodithioate, 4.0 parts pyridine and 80 parts benzene. The resulting mixture was heated at 80° C. for 16 hours and was then washed with 15% aqueous sodium chloride solution and sufficient 4% sodium hydroxide solution to neutralize the acids present in the mixture. The organic phase was further washed with water and finally dried over andhydrous magnesium sulfate. The solvent and low boiling materials were then distilled off leaving 19.6 parts residue of 2-[2,2-bis(chloromethyl)-3-chloro-1-propoxy]-3-p-dioxanethiol S-(O,O-diethyl phosphorothioate) which analyzed: Cl, 24.0%; S, 14.5%; P, 7.0%. This compound was an excellent insecticide as shown by the data in the table below.

*Example 4*

A solution of 59.9 parts 2-methyl-2-nitro-1-propanol and 110 parts 2,3-dichloro-p-dioxane in 170 parts dry toluene was heated under reflux at 110° C. for 48 hours during which time hydrogen chloride was slowly liberated. The resulting mixture was then distilled to remove toluene and unreacted reagents and to recover 27 parts 2-chloro-3-(2-methyl-2-nitropropoxy)-p-dioxane boiling at 118–127° C. (0.5 mm.) which after crystallization from hexane melted at 67–68° C. and analyzed 14.2% Cl. 5.7% N.

To 23.9 parts 2-chloro-3-(2-methyl-2-nitropropoxy)-p-dioxane, prepared as above, in 24 parts dry benzene containing 0.05 parts hydroquinone was added 20.5 parts O,O-diethyl hydrogen phosphorodithioate and 8 parts pyridine in 80 parts dry benzene, and the mixture was refluxed at about 80° C. for 16 hours. The reaction mixture was then washed with 15% aqueous sodium chloride and sufficient 4% aqueous sodium hydroxide to neutralize the acid in the mixture. The organic phase was separated, washed with water and dried over anhydrous magnesium sulfate. The solvent was distilled off under reduced pressure and finally by heating up to 60° C. at 1 mm. leaving 31.2 parts 2-(2-methyl-2-nitropropoxy)-3-p-dioxanethiol S-(O,O-diethyl phosphorodithioate) as residue which analyzed: Cl, 1.3%; S 14.6%; P 7.1%; and N 4.1%. This product was an excellent insecticide as shown by the data in the table below.

*Example 5*

A solution of 51 parts pinacolyl alcohol and 110 parts 2,3-dichloro-p-dioxane in 170 parts dry toluene was heated under reflux at 110° C. for 72 hours during which time hydrogen chloride was slowly liberated. The resulting mixture was then distilled to remove toluene and unreacted reagents and to obtain 54.5 parts of a mixture of 69% 2-chloro-3-pinacoloxy-p-dioxane and 31% 2,3-dipinacoloxy-p-dioxane boiling at 84–95° C. (0.3 mm.) which analyzed 11.0% Cl, 58.0% C and 9.35% H.

To 22.2 parts crude 69% 2-chloro--3-pinacoloxy-p-dioxane prepared as above in 24 parts dry benzene containing 0.05 part hydroquinone was added 20.5 parts O,O,-diethyl hydrogen phosphorodithioate and 8 parts pyridine in 80 parts dry benzene and the mixture was refluxed at about 80° C. for 24 hours. The reaction mixture was then washed with 15% aqueous sodium chloride containing sufficient 4% aqueous sodium hydroxide to neutralize the acid in the mixture. The organic phase was separated, washed with water and dried over anhydrous magnesium sulfate. The solvent was distilled off by heating up to 50° C. at 1 mm. to leave 29.1 parts of a mixture containing 69% 2-pinacoloxy-3-p-dioxanethiol S-(O,O-diethyl phosphorodithioate) as residue which analyzed: Cl 0.4%; S 11.9%; P 5.9%. This product was an excellent insecticide as shown by the data in the table below.

The chemical compositions of this invention were made into emulsifiable concentrates by mixing 1 gram of the compound with 1 ml. benzene and 1 ml. sorbitan monolaurate polyoxyalkylene derivative (Tween 20). This concentrate was then diluted with water to form dispersions of the residue in water varying in concentration from 1.0% to 0.00025%. The dispersions were then tested for their toxicity to caged insects and to mites not only by spraying the insects but by spraying the plants alone as well for the purpose of determining residual toxicity. Standard test methods were used for obtaining the results shown in the table below.

INSECTICIDAL ACTIVITY (PERCENT KILL)

| Y= | Example | Housefly, Percent Conc. | | Mexican Bean Beetle, Percent Conc. | | | Pea Aphid, Percent Conc. | Southern Army Worm, Percent Conc. | Two-Spotted Spider Mite, Percent Conc. | |
|---|---|---|---|---|---|---|---|---|---|---|
| | | 0.1 | 0.05 | 1.0 | 0.1 | 0.05 | 0.1 | 1.0 | 0.1 | 0.005 |
| $-CH_2CCl_3$ | 1 | 100 | 100 | -------- | 100 | 70 | 100 | 100 | 100 | 93 |
| $-CH(CH_2NO_2)CCl_3$ | 2 | 4 | -------- | -------- | 50 | 70 | 90 | 90 | 100 | -------- |
| $-CH_2C(CH_2Cl)_3$ | 3 | 86 | -------- | 70 | -------- | -------- | 20 | 70 | 90 | -------- |
| $-CH_2C(NO_2)(CH_3)CH_3$ | 4 | 98 | 26 | -------- | 90 | 100 | 90 | 80 | 100 | -------- |
| $-CH(CH_3)-C(CH_3)_3$ | 5 | -------- | -------- | 100 | -------- | -------- | 90 | ---------- | 100 | 100 |

The organic dithiophosphate compounds of the formula

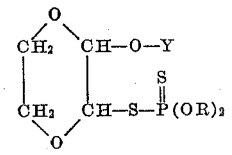

are those in which each R is the same or a different organic radical such as a lower alkyl radical: methyl, ethyl, n-propyl, isopropyl, isobutyl, sec-butyl and n-butyl, and halogen substituted lower alkyl radicals, and Y is generically an alkyl, or an alkyl substituted by halogen, nitro, or both halogen and nitro, such as β-chloroethyl, β,β,β-trichloroethyl, nitrochloropropyl, 2-trichloromethyl-2-nitroethyl, pinacolyl, nitroisobutyl, and the like. In the above definition of the scope of the compounds of this invention, "lower alkyl" is defined to include those alkyl radicals with 1 to 4 carbon atoms. Y preferably contains less than 6 carbons.

The substitution of the halogen atoms in 2,3-dihalo-p-dioxane goes stepwise. In order to obtain a monosubstitution product in the reaction with the first halogen, the reaction with the alcohol HOY should be carried out as a first step and the reaction of the second halogen with the dithiophosphoric acid ester should be carried out as a second step. The halogen removed in these first and second reactions is either driven off or sequestered. The reaction of the alcohol HOY with the 2,3-dihalo-p-dioxane provides substantially entirely monosubstitution with those alcohols which provide the greatest steric hindrance such as trichloroethanol, tribromoethanol, 1,1,1-trichloro-3-nitropropanol and neopentanol and mostly monosubstitution even with the alcohols which provide less steric hindrance.

The substitution of the second halogen even when OY provides much steric hindrance goes quite readily with the diesters of dithiophosphoric acid or its salts.

Both the first step and the second step of halogen substitutions are carried out at temperatures at which the reaction takes place but below the decomposition temperature in the range of 20° C. to about 200° C., preferably in the range of 30° C. to 120° C. In the first step, up to but not exceeding a molecular amount of the alcohol HOY is used. Unreacted reagents are readily recovered for reuse and monosubstituted 2-halo-p-dioxane is obtained in fairly good purity. If the product is contaminated with too much disubstituted p-dioxane, which is not desired, the excess disubstitution is prevented by reducing the amount of HOY used as a reagent in this first step. In the second step, the theoretical amount of the ester of dithiophosphoric acid is used so as to obtain high yields. It is economically advantageous to use a slight excess over the theoretical amount so as to obtain substantially complete conversion. When the reaction is complete, the excess ester of the dithiophosphoric acid is readily removed by washing with water containing sufficient alkali to produce the water-soluble salt.

Both the first step and the second step reactions are preferably carried out in nonaqueous media. Organic solvents are desirable to aid in control of the reaction. Suitable solvents include benzene, toluene, xylene, cyclohexane, hexane, anhydrous alcohol solvents and dioxane. It is preferable to use hydrocarbon solvents when using an amine salt of the dithiophosphoric acid ester or when using an amine or ammonia as a sequestering reagent. After the reaction is complete, the solvent is readily removed by distillation.

The reaction of the alcohol HOY with the 2,3-dihalo-p-dioxane may be carried out in the presence or absence of a sequestering agent for the halogen acid set free in the reaction. However, water must be avoided to prevent hydrolysis. The alcohol HOY may be used in the form of its salt with sodium or potassium, e. g., NaOY or KOY in which case the amount used will be no more than would be used if the alcohol alone were used. Sequestering agents which may be used include pyridine, α-picoline, triethylamine, dimethylaniline, tributylamine, and trimethylamine.

When the diester of dithiophosphoric acid is used as the free acid in the second step reaction, hydrogen halide which is liberated is preferably sequestered by adding a material to combine with the hydrogen halide as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the second step reaction. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates. As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the 2,3-dihalodioxane, the alkaline material is preferably added gradually as needed but it can be added all at once if desired. Ammonia is suitably added gradually as a gas, the solids are suitably added in finely divided form.

The dithiophosphoric acid ester is produced by reacting the lower aliphatic alcohol, which is to form a part of the ester, with $P_2S_5$ preferably in a nonreactive solvent such as benzene, toluene, xylene, hexane or cyclohexane and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the substituted 3-chlorodioxane.

The methods by which the products of this invention are isolated will vary slightly with the reactants used and the product produced. In some instances the chloride salt split out in the reaction separates and can be filtered off. In other instances the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrin, and the like in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of 10.0% to about 0.0001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient organic solvents to aid in effective dispersion. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (by Donald E. H. Frear, second edition, 1948, pages 280–287) for use with known insecticides and include neutral soaps of resin, alginic and fatty acids and alkali metals or alkylamines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface-active dispersing agents which are useful in the compositions of this invention are the omega-substituted polyethylene glycols or relatively long-chain length, particularly those in which the omega substituent is aryl, alkyl, or acyl. Compositions of the toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. As a new composition of matter a compound of the formula

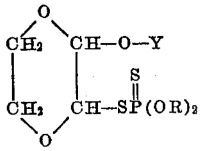

in which R represents lower alkyl, and Y represents a radical of the group consisting of alkyl, haloalkyl, nitroalkyl and halonitroalkyl in which halo represents a halogen of the group consisting of chlorine and bromine and in which alkyl represents a group having less than 6 carbon atoms.

2. As a new composition of matter a compound of the formula

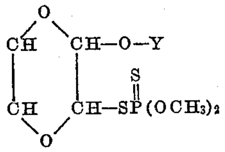

in which Y is a member of the group consisting of alkyl, haloalkyl, nitroalkyl and halonitroalkyl in which halo represents a halogen of the group consisting of chlorine and bromine and in which alkyl represents a group having less than 6 carbon atoms.

3. As a new composition of matter a compound of the formula

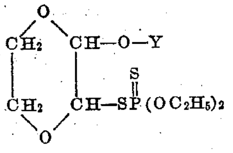

in which Y is a member of the group consisting of alkyl, haloalkyl, nitroalkyl and halonitroalkyl in which halo represents a halogen of the group consisting of chlorine and bromine and in which alkyl represents a group having less than 6 carbon atoms.

4. As a new composition of matter a compound of the formula

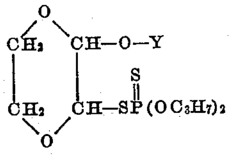

in which Y is a member of the group consisting of alkyl, haloalkyl, nitroalkyl and halonitroalkyl in which halo represents a halogen of the group consisting of chlorine and bromine and in which alkyl represents a group having less than 6 carbon atoms.

5. A pesticidal composition comprising the compound of claim 1 and an insecticidal adjuvant.

6. A pesticidal composition comprising the compound of claim 2 and an insecticidal adjuvant.

7. A pesticidal composition comprising the compound of claim 3 and an insecticidal adjuvant.

8. A pesticidal composition comprising the compound of claim 4 and an insecticidal adjuvant.

References Cited in the file of this patent

UNITED STATES PATENTS

| | | |
|---|---|---|
| 2,529,304 | Mikeska | Nov. 7, 1950 |
| 2,531,129 | Hook | Nov. 21, 1950 |
| 2,542,604 | Weisel | Feb. 20, 1951 |
| 2,565,920 | Hook | Aug. 28, 1951 |
| 2,565,921 | Hook | Aug. 28, 1951 |